US008844372B2

(12) United States Patent
 Sgourakes

(10) Patent No.: US 8,844,372 B2
(45) Date of Patent: Sep. 30, 2014

(54) VORTEX FLOW METER

(75) Inventor: George E. Sgourakes, Millis, MA (US)

(73) Assignee: AVGI Engineering, Inc., Millis, MA (US)

( * ) Notice: Subject to any disclaimer, the term of this patent is extended or adjusted under 35 U.S.C. 154(b) by 184 days.

(21) Appl. No.: 13/583,080

(22) PCT Filed: Mar. 18, 2011

(86) PCT No.: PCT/US2011/028929
§ 371 (c)(1),
(2), (4) Date: Nov. 16, 2012

(87) PCT Pub. No.: WO2011/119420
PCT Pub. Date: Sep. 29, 2011

(65) Prior Publication Data
US 2013/0068036 A1 Mar. 21, 2013

Related U.S. Application Data

(60) Provisional application No. 61/316,499, filed on Mar. 23, 2010.

(51) Int. Cl.
 *G01F 1/34* (2006.01)
 *G01F 1/32* (2006.01)
(52) U.S. Cl.
 CPC ............ *G01F 1/3209* (2013.01); *G01F 1/3245* (2013.01)
 USPC ...................................................... 73/861.42
(58) Field of Classification Search
 USPC ...................... 73/861.24, 861.22, 861.03, 718
 See application file for complete search history.

(56) References Cited

U.S. PATENT DOCUMENTS 3,698,245 A 10/1972 McNabb
3,729,995 A 5/1973 Kovacs et al.
(Continued)

OTHER PUBLICATIONS

International Search Report for Application No. PCT/US2011/028929, mailed Nov. 14, 2011. (9 pages).

(Continued)

*Primary Examiner* — Jewel V Thompson
(74) *Attorney, Agent, or Firm* — Pepper Hamilton LLP; Reza Mollaaghababa; Thomas J. Engellenner

(57) ABSTRACT

A vortex flow meter that senses the alternating pressure variations generated by a fixed vortex shedding generator. The alternating pressure variations of the vortices within the rows on each side of the vortex shedding generator act upon flexible elements producing forces on long columns that are transmitted to remotely located piezoelectric force sensors. The alternating forces upon the two columns are used to determine the passage of a vortex and thereby the flow. Improved output signal by minimizing loss of parasitic energy. 97% of the available signal is applied to the piezoelectric force sensors as compared to conventional 60%. Process influences such as vibration in all planes and pumping pulsations are equal and opposing and are rejected by the sensor. A capability of operating at extreme process temperatures is assured for the high temperature of the process is dissipated to the environment along the long columns. Reliability of operation is assured for the sensor has no process seals and is easily replaced by technicians, without interrupting flow or venting process. Improved process containment is realized with construction having a high safety factor and multiple stages of process containment. Wafer form reduces installation costs and an optional redundant sensor improves reliability of operation, decreases pumping losses, and only requires one K-factor. Process up-time is assured with an economical redundant sensor.

35 Claims, 11 Drawing Sheets

(56) References Cited

U.S. PATENT DOCUMENTS

Figure 1:
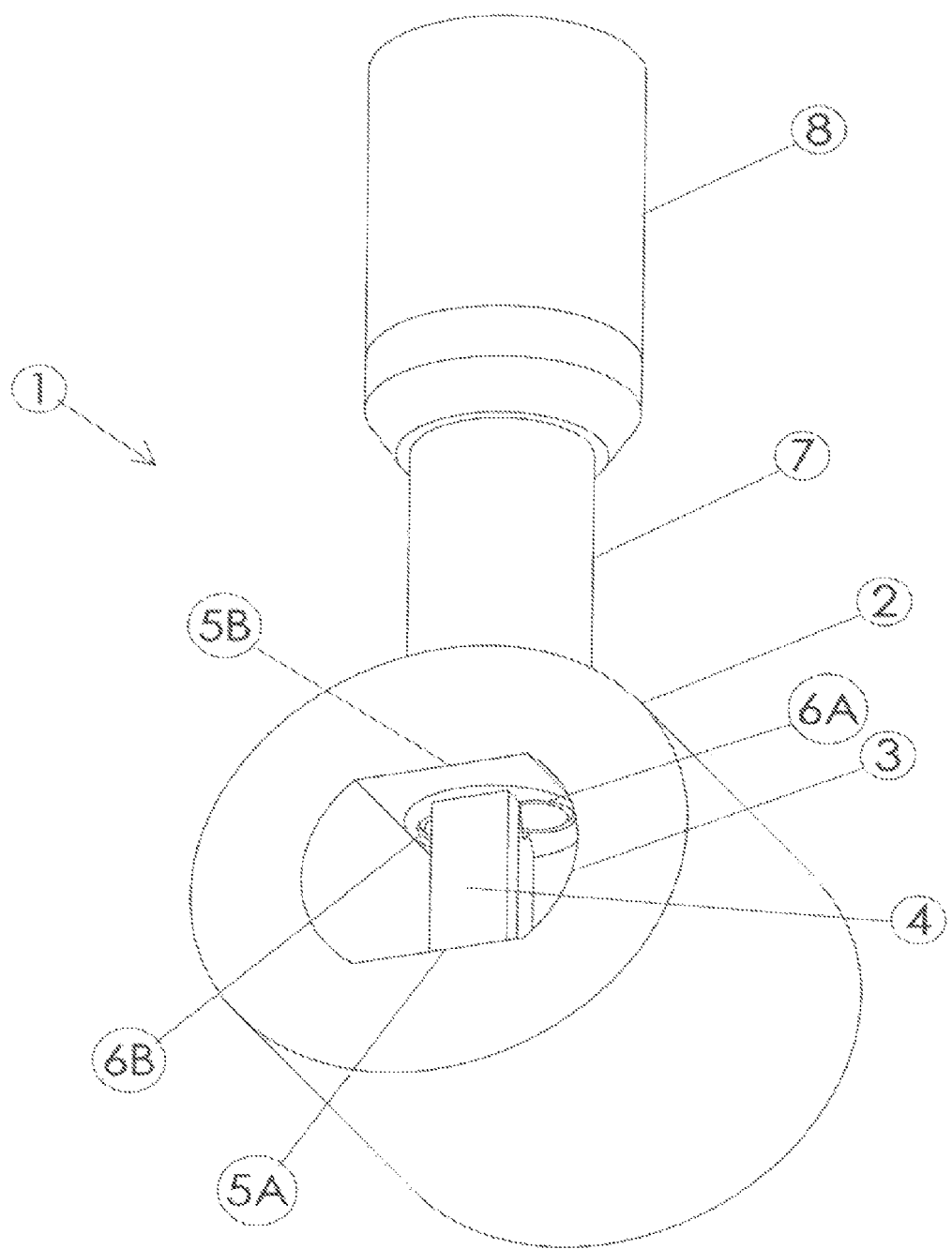

| | | |
|---|---|---|
| 4,033,188 A | 7/1977 | Herzl |
| 4,085,614 A | 4/1978 | Curran et al. |
| 4,088,020 A | 5/1978 | Sgourakes et al. |
| 4,161,878 A | 7/1979 | Fussell, Jr. |
| 4,220,046 A | 9/1980 | Sqourakes |
| 4,380,935 A | 4/1983 | Sgourakes et al. |
| 4,398,194 A | 8/1983 | Johnston |
| 4,520,678 A | 6/1985 | Koziol et al. |
| 4,529,678 A | 7/1985 | Ohta |
| 4,891,990 A * | 1/1990 | Khalifa et al. ............. 73/861.24 |
| 5,003,827 A | 4/1991 | Kalinoski et al. |
| 5,209,125 A | 5/1993 | Kalinoski et al. |
| 6,973,841 B2 | 12/2005 | Foster |
| 7,650,798 B2 | 1/2010 | Foster et al. |
| 2005/0217389 A1* | 10/2005 | Foster ........................ 73/861.22 |
| 2009/0019944 A1* | 1/2009 | Foster et al. ............... 73/861.24 |
| 2010/0018323 A1* | 1/2010 | Cheng et al. ............... 73/861.24 |

OTHER PUBLICATIONS

International Preliminary Report on Patentability for Application No. PCT/US2011/028929, mailed Oct. 4, 2012. (6 pages).

Fluctuating Pressure Profile and Sensor Design for a Vortex Flowmeter ASME Publication 78-WA/FM-3 Sgourakes et al. Fluid Meters Division of the American Society of Mechanical Engineers Winter Annual Meeting San Francisco CA Dec. 10-15, 1978.

\* cited by examiner

VORTEX FLOW METER

FIELD OF THE INVENTION

The present invention relates to vortex shedding flow meters and piezoelectric pressure sensors.

BACKGROUND OF THE INVENTION

Conventional vortex shedding flow meters have vortex shedding generators that produce vortices alternating sequentially from each side of the generator producing two rows of vortices having opposing direction of rotation, in a formation known as a von Karman vortex street. The shedding frequency of these vortices is typically detected and measured by sensing the influence of a differential pressure between a fully formed vortex and a depleted vortex to determine the mean flow velocity. The frequency is linearly proportional to the mean flow velocity.

Sensors used to detect the vortices often include thin diaphragms that respond to the alternating differential pressure variations generated by the vortices. For example in U.S. Pat. No. 4,085,614 to Sgourakes et al., differential pressure is applied to the diaphragms and transferred to a piezoelectric element sealed within a sensor housing via an electrically non-conductive hydraulic fill fluid. This type of sensor cannot be used for measuring the flow velocity of process fluids at extreme temperatures mainly due to the operating temperature limitations of fill fluids and conventional piezoelectric elements used in these types of sensors. Meters used for measuring high temperature fluids are therefore traditionally constructed without fill fluids.

Such meters for measuring high temperature fluids without fill fluids may detect vortices with sensors located either within or external to the flow conduit. An example of meters with sensors within the flow conduit is shown in U.S. Pat. No. 5,003,827 to Kalinoski et al in which the vortices are sensed by a spool member slideably disposed in a chamber of the shedder that shuttles side to side as a result of the alternating differential pressures of the vortices. The spool member in turn generates mechanical forces upon the piezoelectric sensor. In this type of system, the piezoelectric sensor cannot be replaced without flow interruption, the process flow line must be vented, requires process seals and the piezoelectric sensor material must be conditioned and protected to provide a useful lifetime for operation at these high temperatures. An example of means to protect the piezoelectric sensor material with an oxygen diffusion path is shown in U.S. Pat. No. 7,650,798 Foster et al.

One example of meters for measuring high temperature fluid flow, with flow sensors external to the flow conduit, is shown in U.S. Pat. No. 4,891,990 to Khalifa. In this meter a flexible portion of the vortex generator bends a flat plate and piezoelectric sensors sense the bending of the plate. Other examples of vortex flow meters with the sensor external to the flow path exist are shown in U.S. Pat. No. 6,973,841 to Foster, which discloses a differential pressure responsive paddle as a part of the vortex shedding generator; the paddle applying a rocking motion to a region of reduced thickness in a portion of the conduit. The motion of the paddle is transmitted by a lever of relatively low stiffness compared to the piezoelectric sensor which results in a low force applied to the piezoelectric sensor thereby reducing the performance characteristics of the sensor. Piezoelectric sensors in this configuration are field replaceable with factory support. This design is further flawed, however, in that if the reduced thickness portion of the conduit fails to contain high process pressures and/or hazardous fluids.

These piezoelectric sensors operating at high temperatures are subject to reliability concerns as disclosed in U.S. Pat. No. 5,209,125 to Kalinoski et al, as well as U.S. Pat. No. 7,650,798. Both references disclose methods for improving reliability of piezoelectric sensors by conditioning the piezoelectric sensor operating in high temperature environments.

Thus present vortex flow meters with either the sensor located within the flow conduit or external to the flow conduit have concerns that are not addressed. A need exists for the elimination of these concerns to provide a user reliable, high performance and economical product.

Furthermore, most of the existing vortex flow meters do not provide a redundant measurement option in a wafer form for the relatively large components cannot be located within the bolt pattern required for wafer configuration.

Many flow meters with a wafer form are limited to low pressure four bolt flanges. The present alternative for high pressure flows are flanged flow meters. Redundant sensing requires costly-flanged dual meters or a much more costly-flanged dual in-line meter. The dual in-line meters require two flow K-factors and have increased pressure drop causing greater pumping losses.

SUMMARY OF THE INVENTION

In one aspect, the instant invention relates to a vortex flow meter comprising a body having a flow conduit, a vortex generator located within and rigidly fixed to said flow conduit, a cavity within said body connecting said flow conduit to the exterior of said body, a housing located within said cavity that is attached to said body in a manner to contain process fluids, a flexible element that is attached to said housing in a manner to contain process fluids, the flexible element being located at the junction of said cavity and said flow conduit, said flexible element being attached to a column within said housing wherein said column transfers a uniaxial force developed by the varying pressure of a vortex acting on the effective area of said flexible element and said uniaxial force acts upon a force sensor that is in rigid physical contact with said column, said force sensor being removably attached to the exterior of said body and wherein; said force sensor is capable of being removed from said body while flow continues in said body. In one embodiment the force sensor is capable of operating at a high temperature. In a preferred embodiment heat that would otherwise be transmitted from the area of the flow where the vortex generator is located is dissipated to the environment along the length provided by said column providing a much lower operating temperature environment for the remotely located sensor.

In another aspect, the invention relates to a vortex flow meter comprising a body, a flow conduit within said body, a vortex generator located within said flow conduit and rigidly fixed to said flow conduit, first and second cavities within said body connecting said flow conduit to the exterior of said body and having first and second housings located within each of said first and second cavities, the housings being attached to the body in a manner to contain process fluids. The invention further comprising a flexible element that is attached to each of the first and second housings in a manner to contain process fluids; the first and second flexible elements being located at the junction of said first and second cavities and said flow conduit, wherein said flexible elements are attached to a first column and a second column respectively within said first and second housings, wherein said first and second columns apply the uniaxial forces developed by varying pressure of vortices acting on the effective area of said first and second flexible elements upon a first and second force sensor, the force sensors being in rigid physical contact with said first and second columns and wherein said first and second force sensors are removably attached to the exterior of said body and are capable of being removed from said body while flow continues in said body. In a preferred embodiment heat is dissipated to the environment along the length provided by said column providing a much lower operating temperature environment for the remotely located sensors.

In yet another aspect, the invention relates to a vortex flow meter having a body, a flow conduit within said body, a vortex generator located within and rigidly fixed to said flow conduit, first and second cavities within said body connecting said flow conduit to the exterior of said body, a housing located within each of said first and second cavities that is attached to said body in a manner to contain process fluids, a flexible element that is attached to each of the first and second housings in a manner to contain process fluids, the flexible elements located at the junction of said first and second cavities and said flow conduit. The first and second flexible elements of the flow meter are attached to first and second columns within said first and second housings, the columns being in rigid physical contact a differential force sensor. The first and second columns apply uniaxial forces to the differential force sensor, the forces arising as a result of the varying pressure of the vortices acting on an effective area of said first and second flexible elements. A pressure to uniaxial force transducer is defined, in one embodiment, as an assembly having said flexible elements, said columns and said housings. The differential force sensor is removably attached to the exterior of said body. In a preferred embodiment, the process containment housing allows for the differential force sensor to be removed from said body while flow continues in the body. In an even more preferred embodiment, heat is dissipated to the environment along the length provided by said first and second columns and provides for a significant temperature difference between the vortex generator and the force sensor. The ability to increase the length of the columns without degrading operational performance allows the piezoelectric sensor to operate in a lower temperature environment with very high process temperatures.

In a further aspect, the differential force sensor of the vortex flow meters of the invention comprises a beam having equal first and second moment arms equidistant from a common center of rotation, a first force is applied at the termination of the first moment arm from the common center of rotation and this first force is sensed and restrained by a first piezoelectric force sensor, additionally a second force is applied at the termination of the second moment arm from the common center of rotation and this second force is sensed and restrained by a second piezoelectric force sensor, the first and second piezoelectric force sensors provide an electrical output proportional to the difference of said first and second forces and a means for assuring a prescribed preload is maintained upon first and second piezoelectric force sensors. In this aspect of the invention, the difference in said output of first and second piezoelectric force sensors is a measure of the difference between first and second forces wherein the differential force sensor produces no output when the first and second forces are equal. In a preferred embodiment said differential force sensor is removably attached to a mounting surface upon the body.

This configuration of the differential force sensor of the invention provides a number of benefits. First, the piezoelectric sensors are not stressed by the very high direct forces that would exist without the differential beam. The differential beam supports all forces and only transfers the difference in the applied forces to the piezoelectric sensors. Thusly, the piezoelectric sensors are not subjected to high forces such as those due to process pressures that may de-pole the piezoelectric sensors. Second, the piezoelectric sensors operate over a lower value fixed portion of the relationship between force and electrical output. Otherwise the response of the piezoelectric sensors is dependent upon the process pressure and the operating span varies from low values associated with low process pressure and high values associated with high process pressure. Operating over a lower value fixed portion provides a more linear response and a higher output for the response degrades if high process pressure causes the operating point to be in the more non-linear portion of the relationship. Third, sensing only the difference in the forces between the uniaxial force transducers provides a mechanical filtering of common mode noise such as inertial or process pressure pulsations. The common mode noise is applied simultaneously to the differential force sensing beam and being equal in value are rejected by the differential concept.

In one embodiment the flexible element of the vortex flow meter of the invention can comprise a bellows having one or more convolutions, the bellows being capable of producing uniaxial forces upon the first and second columns in proportion to applied pressure applied.

In another embodiment, the flexible element of the vortex flow meter of the invention can comprise a diaphragm that produces uniaxial forces upon first and second columns in proportion to applied pressure.

In a further aspect, the vortex flow meter of the invention can have one or more "o" ring seals within said first and second housings that seal said first and second housings and said first and second columns in a manner to achieve process containment upon failure of said first and second flexible elements thereby providing for multiple and redundant process containment.

The vortex flow meter of the invention can have a spring within each of said housings thereby providing a preload to maintain intimate contact of said the column or columns with their related force sensors with the contact between the column(s) and the force sensor(s) being maintained during differential thermal expansion of the column or columns and their related housing(s) or with high inertial accelerations of the vortex flow meter.

The flow meter can optionally have a stop within each of the pressure housings for restraining the column or columns from the force due to the process pressure acting upon the area of the flexible elements when the force sensor or sensors are removed.

Additionally, the flow conduit of the flow meter may comprise first and second flat surfaces at the first and second interfaces of said vortex generator and said flow conduit, the first and second flat surfaces terminating at the extremities of said flow conduit. The first and second flat surfaces being parallel and having a chordal width equal or less than W, wherein W is defined by W=(0.4*pipe inside diameter+0.94) expressed in inches. The first and second flat surfaces are interconnected by portions of a first and second cylindrical surface of said body thereby providing improved uniformity of vortex formation. A lower flow limit is achieved due to the reduced cross sectional flow area of said flow conduit increasing the velocity within the flow conduit with respect to average pipeline flow.

In another aspect the flow meter may have a circuit capable of electronic signal conditioning and amplification. The circuit may include a means for automatically and constantly assuring the absolute electrical signal level response of each of the said force sensors for equal inputs is equal thereby resulting in enhanced elimination of common mode influences is achieved.

In one embodiment the electronic signal conditioning and amplification circuit comprises a comparator whose input is the output of a first and a second force sensor. One of the two said inputs is used as the reference for said comparator rather than the conventional use of a fixed zero reference value, thereby the influences due to variations in the mean value of the said first and second force sensors are less significant than conventional use of a fixed zero reference value.

In another aspect, the vortex flow meter of the invention has first and second pressure to uniaxial force transducers and first and second differential force sensors located at a first and second termination of said vortex generator, and a flow conduit provide for redundant flow metering capability and the ability to operate with only one flow K-factor.

In one aspect the flexible element of the vortex flow meter of the invention has a surface normal to the centerline axis of vortices and is located within the said first or second flat surfaces.

Figure 5:
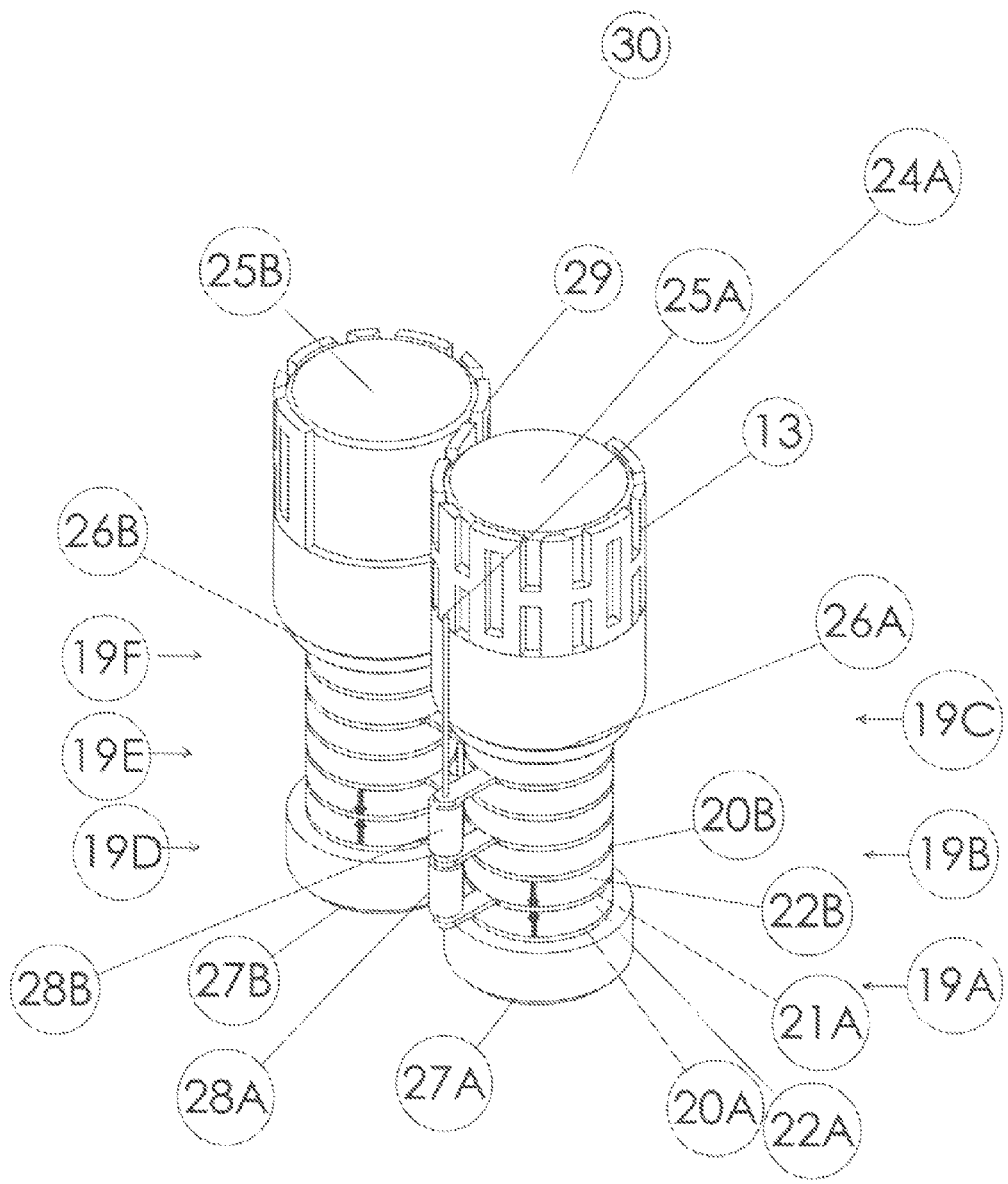

In another aspect the vortex flow meter of the invention further comprises a differential force sensor having a means for maintaining a prescribed preload upon a first and second piezoelectric electric sensor comprised of: a first and second loading screw; and an extension spring that is attached and made to conform to a portion of a cylindrical surface of a first loading screw of the first piezoelectric sensor, said spring is made to conform to a portion of cylindrical surface of said second loading screw and the spring is extended and then attached to said second loading screw, thereby maintaining the prescribed loading of the first and second piezoelectric force sensors. This is shown in FIG. 5.

Figure 5A:
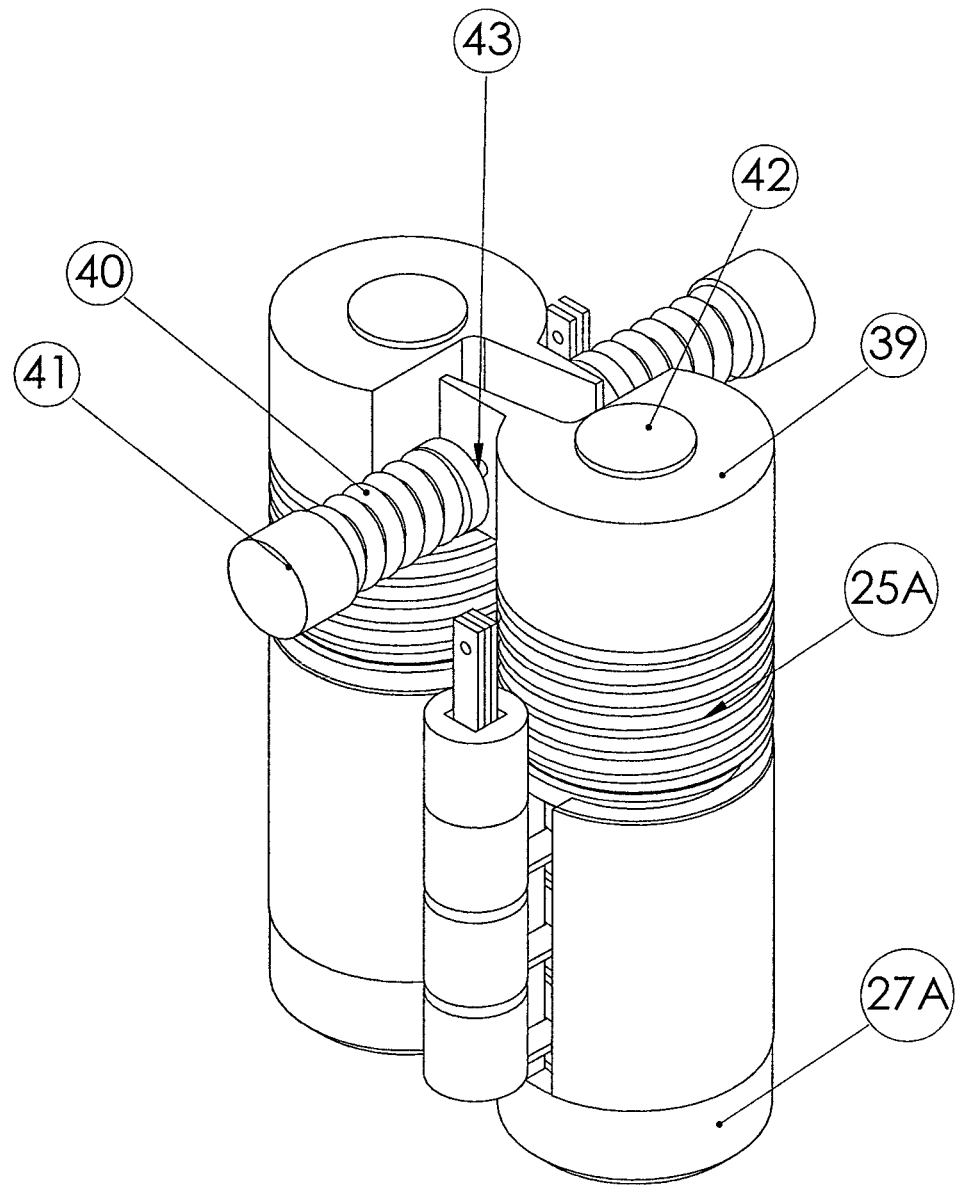

An alternative approach is shown in FIG. 5A. A spring applies a preload to a crank and the crank transfers this force into a torque that maintains the preload upon the piezoelectric sensor by means of a screw.

The two approaches utilize a common implementation. Basically, a low spring rate but highly deflected spring member transfers a relatively constant force to a force multiplier being either a translational wedge or a rotational screw thread and the force multiplier applies and maintains the desired preload of the piezoelectric sensor.

In yet another aspect the vortex flow meter of the invention has a process temperature sensor located within said vortex generator, the temperature sensor including means for providing electrical connectivity to a device for producing an output of the process temperature sensed.

In a further embodiment the vortex flow meter has a process pressure sensor located within said vortex generator and a means for providing electrical connections to a device for producing an output of the process pressure sensed. The uniaxial force transducer provides a force proportional to the process pressure and the effective area of the flexible element. This force provides an accurate measure of the process pressure. The force sensors may be integrated into the column, the differential force sensing beam or the support of the differential beam.

BRIEF DESCRIPTIONS OF THE DRAWINGS

Figure 2:
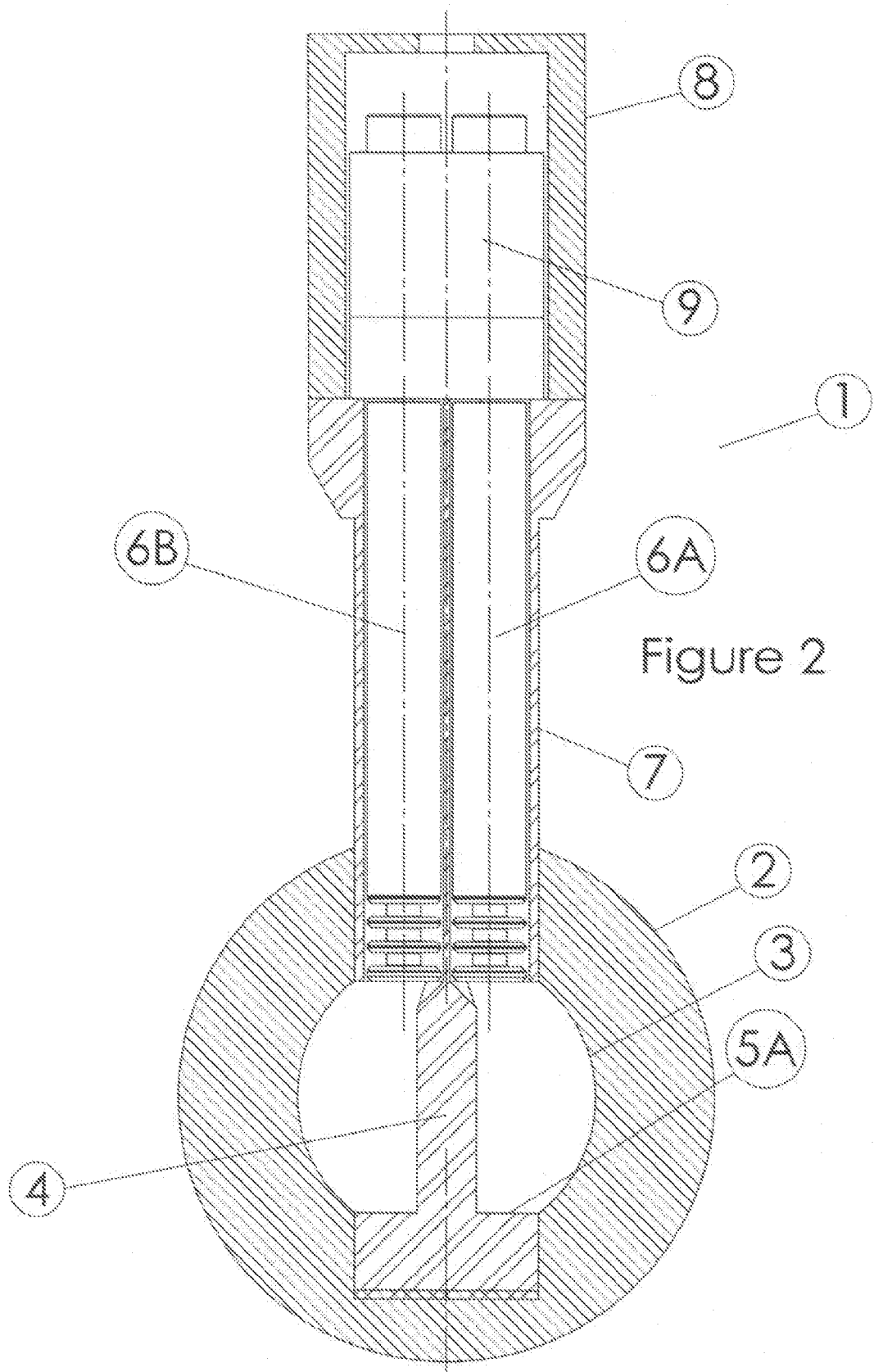
Figure 3:
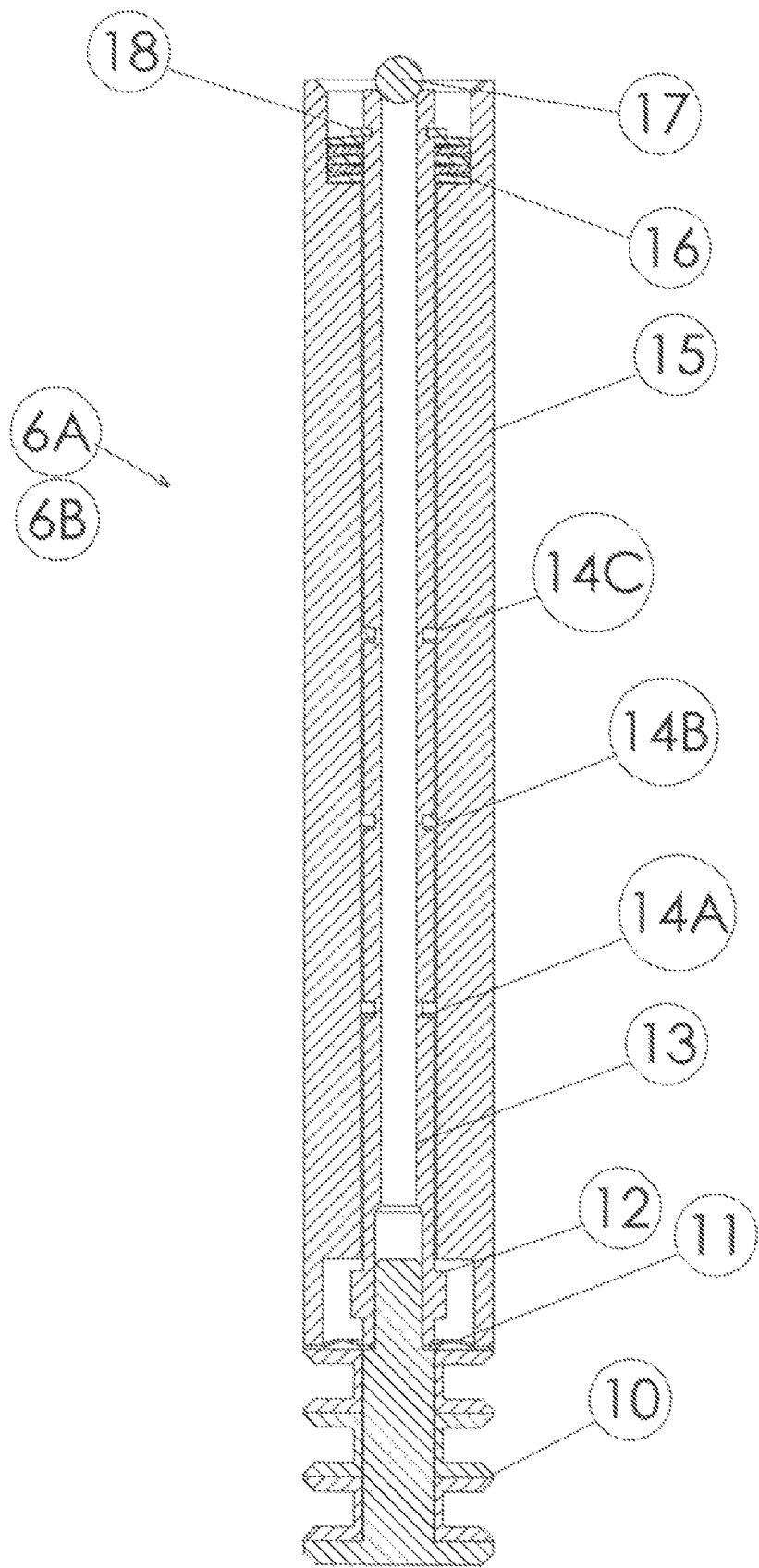
Figure 4:
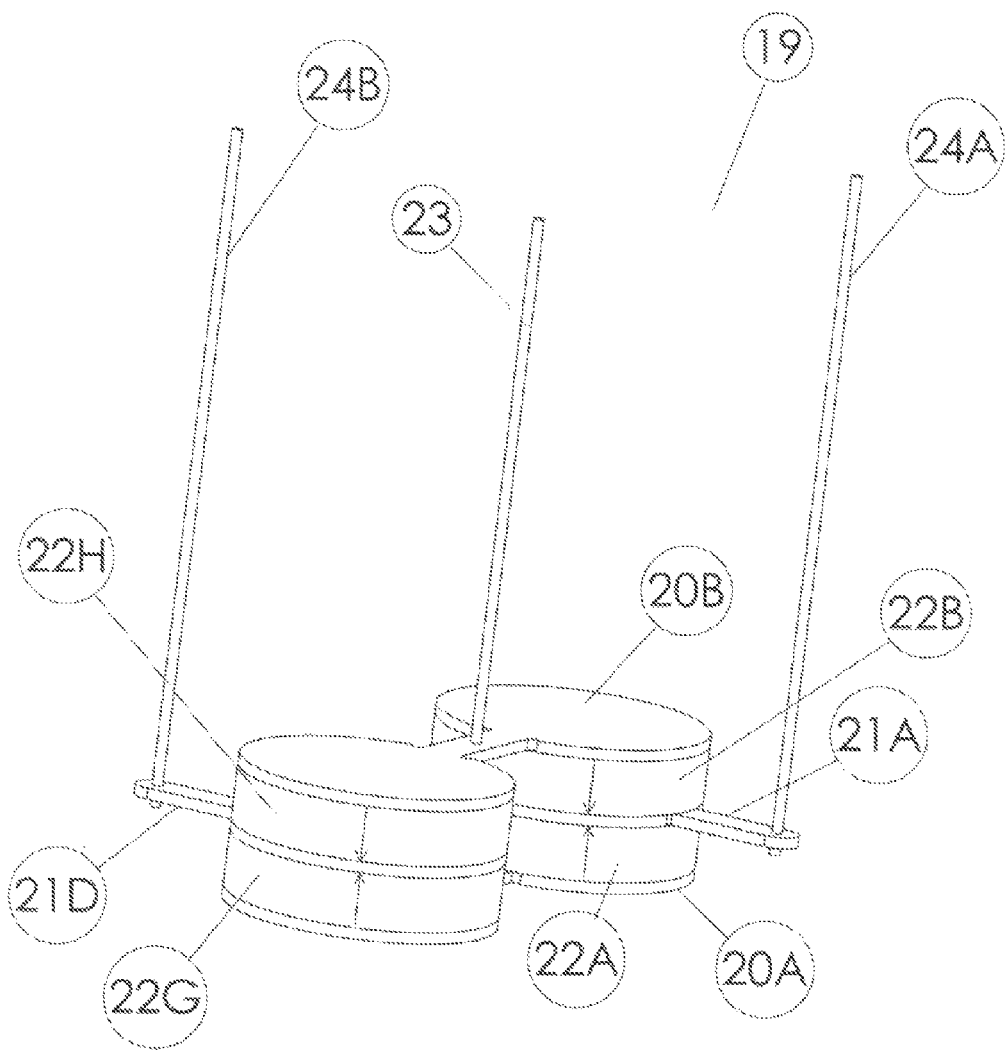
Figure 6:
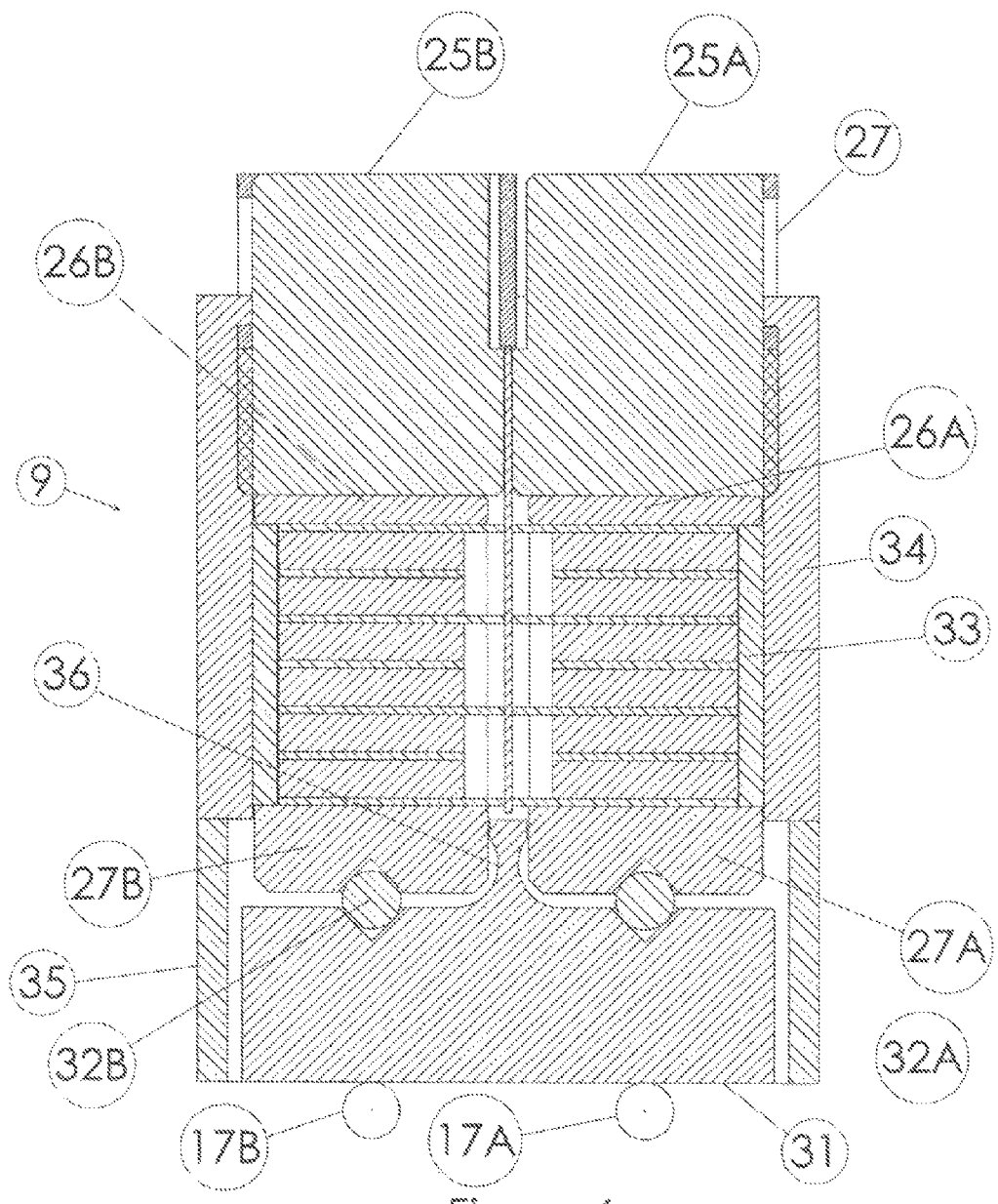
Figure 7:
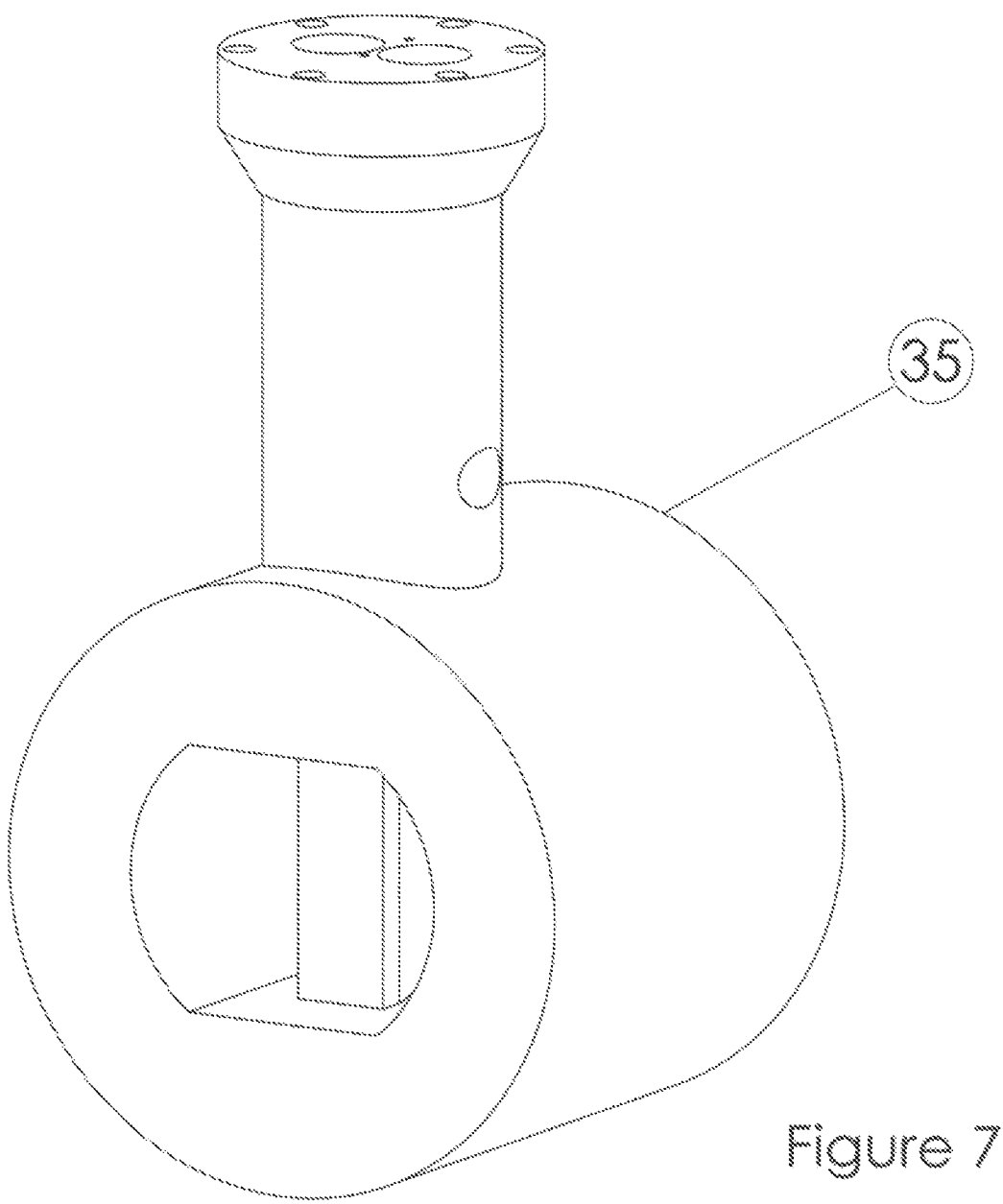
Figure 8:
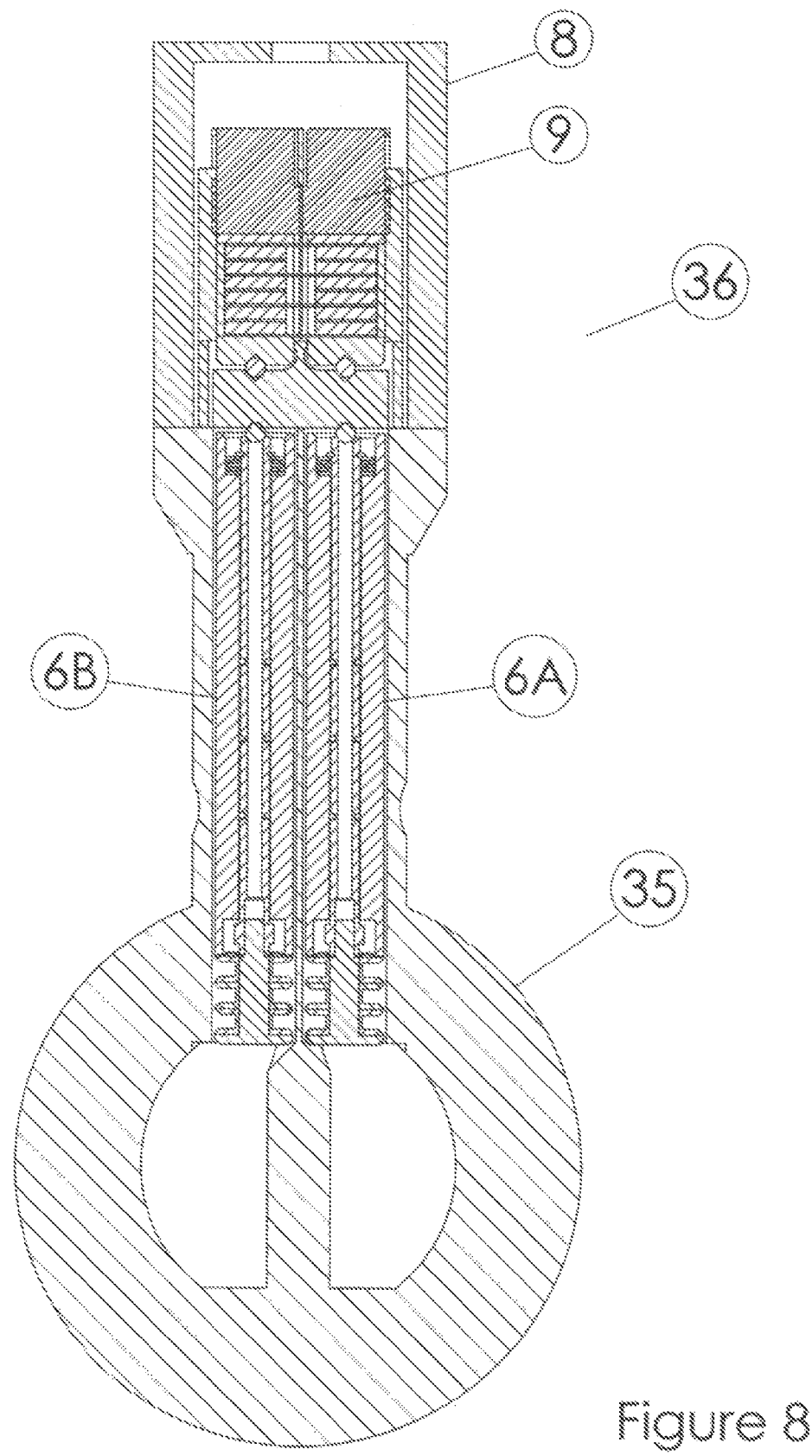
Figure 9:
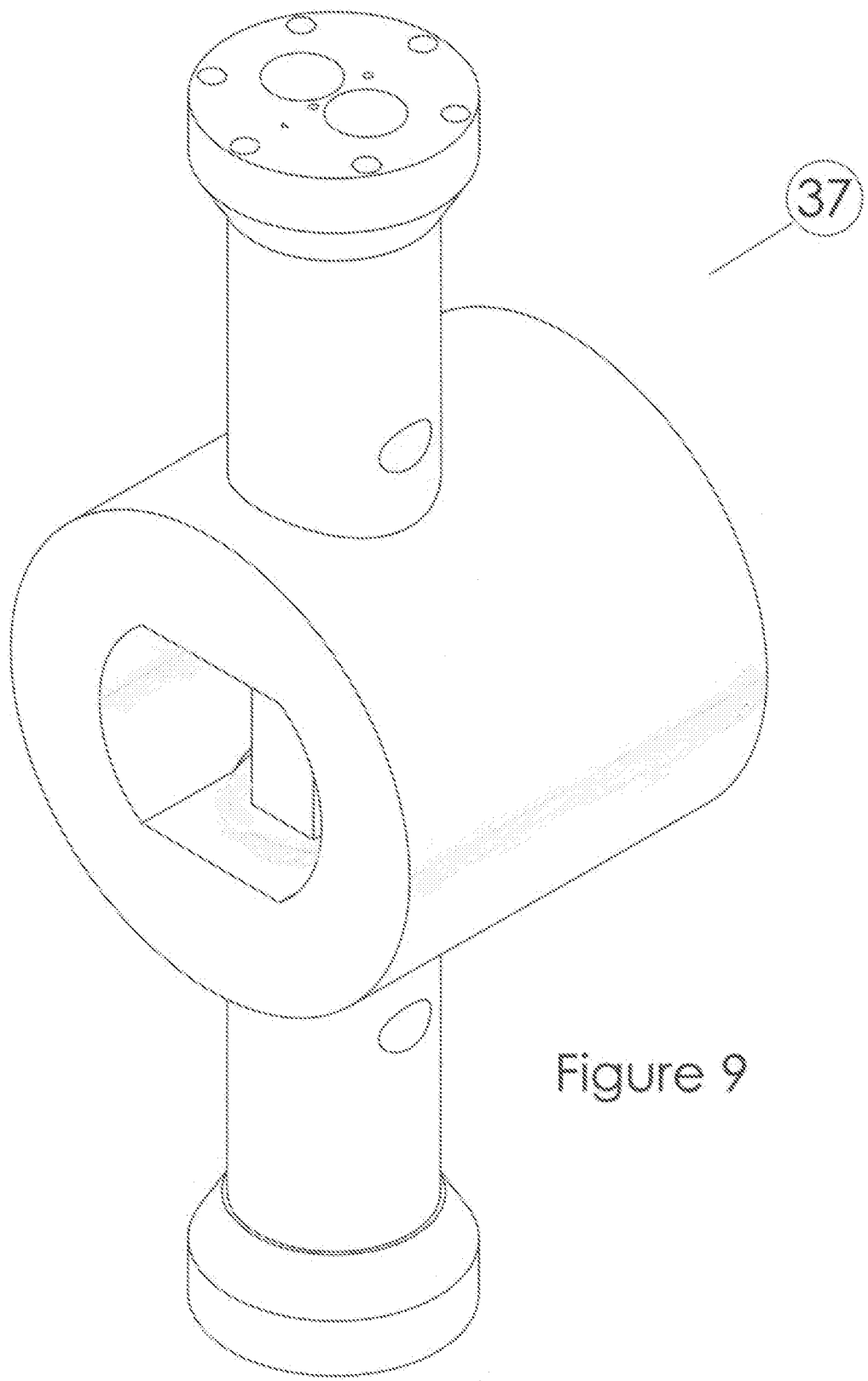
Figure 10:
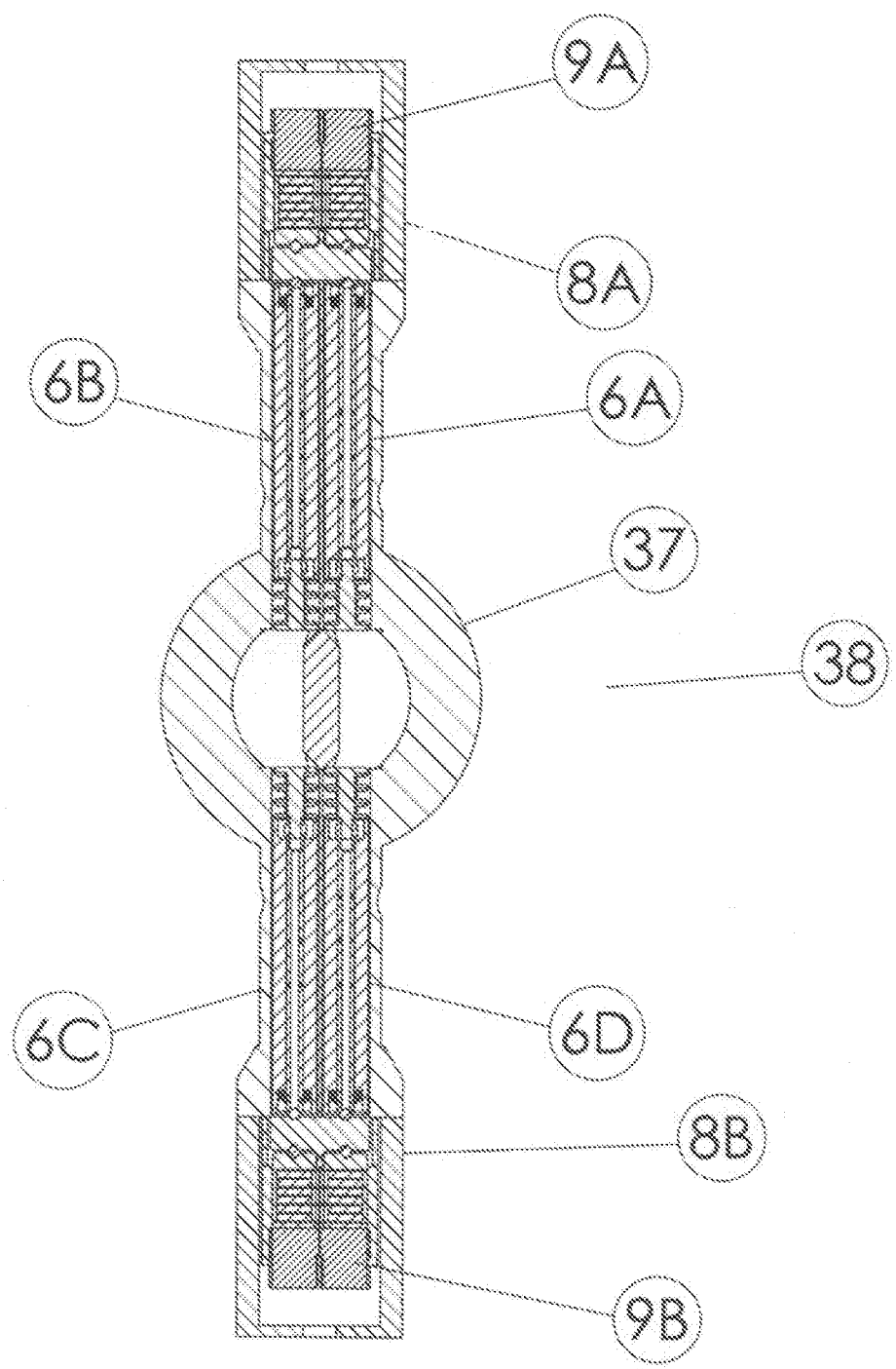

FIG. 1 is an isometric view of the vortex flow meter.
FIG. 2 is a cross sectional view of the vortex flow meter.
FIG. 3 is a cross sectional view of the pressure to uniaxial force transducer.
FIG. 4 is an isometric view of the piezoelectric sub-assembly.
FIG. 5 is an isometric view of the piezoelectric assembly.
FIG. 5A is an isometric view of an alternative piezoelectric assembly.
FIG. 6 is a cross sectional of the differential force sensor.
FIG. 7 is an isometric view of an economical one piece casting for body, shedder and sensor mounting.
FIG. 8 is a cross sectional view of economical one piece casting for body, shedder and sensor mounting.
FIG. 9 is an isometric view of a one piece casting for body, shedder and dual sensing mounting for redundant wafer vortex flow meter.
FIG. 10 is a cross sectional view of a redundant vortex flow meter.

DETAILED DESCRIPTION OF THE INVENTION

A vortex flow meter having many benefits is disclosed. The benefits are based and derived from a proven principle of conservation of energy that assures a maximum amount of the available energy of the input signal is applied to the sensor. This invention assures that the available signal is transferred effectively to a sensor located outside the flow conduit to within 97% of available energy of the input signal.

This effectiveness is achieved by use of a pressure to uniaxial force transducer that has no springs or levers. Springs and levers are not effective for an undesired deflection with applied loads diminishes the energy available to the sensor.

The varying pressure of vortices being shed from the vortex generator provides the energy. The varying pressure of vortices is described in the referenced article ASME Publication 78-WA/FM-3. This pressure is applied to the effective area of a diaphragm or a bellows and produces a force (Ft) that is transmitted by a column directly to a remote piezoelectric sensor. The column and the piezoelectric sensor are in series and the diaphragm or bellows is in parallel. The column and the piezoelectric sensor have a very high spring rate and minimize the undesirable energy absorbing deflection of the bellows or spring that is in parallel.

The piezoelectric sensor has a very high spring rate (Kp). Optimally, the column should also have a similar high spring rate (Kc) and the diaphragm or bellows a very low spring rate (Kd). The serial combination of piezoelectric element and column (Kpc) is Kpc=(Kp*Kc)/(Kp+Kd). The total spring rate (Kt) is then determined to be Kt=Kd+Kpc. The force upon the piezoelectric element (Fp) is Fp=(Kpc/Kt)*Ft.

Applying nominal values reveals Kp=11,000,000 psi, Kc=450,000 psi. and a very high safety factor diaphragm or bellows Kd=15,000 psi. The ratio of Fp/Ft=0.97 Therefore 97% of the applied signal is applied to the piezoelectric sensor in a safe manner. Use of high modulus material for the column can produce a higher ratio of 99%. A comparison of present vortex flow meters finds from published information the ratio of Fp/Ft can be determined to be approximately 60%. Thusly, the uniaxial force transducer concept provides performance benefits and additionally extreme process temperature capabilities.

This increased effectiveness provides decreased motion that assures lengthy service life and reliability.

This high signal is amplified and conditioned by an electronic module. The sensor provides the difference in the available signal between the diaphragms or bellows located on the left and right sides of the vortex generator as viewed looking downstream in the flow direction. Since the signals are out of phase with each other this doubles the desired signal and eliminates any common signal of undesired influences such as vibration or pump pulsations.

However, if there is drift in the sensor due to electronics, piezoelectric elements or mechanical components, the differential will result in a residual and not be self-canceling. Thus a means has been provided that assures the signal available from each of the sensors is maintained at equal outputs for equal inputs. This is provided by an automatic gain control that continually monitors the level of the two sensors and adjusts the levels as required to achieve the desired equality. Present practice in existing devices is to adjust the relationship only during assembly and no consideration is provided for performance degradation of sensors and mechanisms that would occur with time.

The ability to determine the passage of a vortex is influenced by spurious noise and also biases in the average of the varying pressure of the sequential vortices. The bias in the varying pressure of the sequential vortices is effectively minimized by electronic means that utilizes one of the vortex rows as a reference.

An ability to operate at high process temperatures is achieved with the long columns eliminating the limitation imposed by seal fluid operating temperature limits. Enhanced heat transfer to the environment reduces the temperature along the long column. The piezoelectric sensor therefore operates well within established temperature limits. The high process temperature limit is dependent mainly upon the material chosen for process wetted parts. A higher process temperature limit is easily implemented by extending the length of the columns with higher temperature rated materials of construction.

The concept is compact in size for the columns can be located between the boltholes of eight bolt high-pressure flanges allowing a wafer form of construction. Wafer form is a cost benefit to the user for two costly flanges as required in a flange and tube construction are eliminated.

A significant up-time benefit is provided for the sensor may be removed and replaced upon failure without interrupting or without venting the process flow and without the use of process seals.

A further improvement in up-time is provided with a redundant form having an additional sensor within the wafer flow meter. This eliminates the costly alternative of providing two meters in series, the on going operational cost burden of high pressure drop pumping costs and the inconvenience of two K-factors.

In FIG. 1, is shown the vortex flow meter 1, body 2, flow conduit 3, vortex generator 4, uniaxial pressure to force transducers located on right side 6A and left side 6B of vortex generator 4 and a differential force sensor 9.

Fluids, which can be a liquid or a gas, are contained within flow conduit 3 and as the fluid advances it is influenced by the restriction of a vortex generator 4 and produces vortices. These vortices form a Von Karman vortex street having a row of vortices on the left and right sides of the vortex generator 4. Thus the rows are filled sequentially with vortices in an alternating manner. The frequency of alternation is a means of determining the flow in flow conduit 3.

Each vortex has an axis of rotation and a pressure variation about this axis of rotation. The pressure variation is substantial and is discussed in the referenced ASME Publication 78-WA/FM-3. These alternating pressure variations are applied to pressure to uniaxial force transducers 6A and 6B of FIG. 1.

The frequency stability and vortex strength are believed to be enhanced by providing a flow conduit with two parallel flat surfaces 5A and 5B of FIG. 1 connected with cylindrical portions of flow conduit 3. These flat surfaces 5A and 5B present an unvarying interface for the termination of the axis of rotation of the vortices as they proceed downstream in the flow conduit 3. The optimized flat chordal width W is found to be W=0.286*pipe inside diameter+0.663.

The pressure to uniaxial force transducers 6A and 6B are shown in cross section in FIG. 3. A force is developed by the varying pressure of vortices upon the effective area of bellows 10. This force is supported by a column 13, which transfers this force in a uniaxial manner to a differential force sensor 9 (not presently shown and to be discussed shortly) with ball 17. The differential force sensor 9 has a very high spring rate and limits the motion of ball 17. The motion of the bellows 10 is mainly due to the minimal axial deflection incurred from this force acting upon spring rate of column 9. Thus, the available force is transferred to the differential force sensor 9 very effectively as described earlier within 97%.

The bellows 10 of FIG. 3 is of substantial construction and would restrain column 9 when the force sensor 9 is removed and replaced. However, as a precaution, a secondary restraint of column 9 within the housing 15 is provided by a stop 12. Furthermore, in the event of a failure to contain process fluid due to a failure of bellows 10, a diaphragm 11 would contain the process fluid. Additionally there are three "o" rings 8 that would contain process fluid in the event of a failure of bellows 10 and diaphragm 11. The three "o" rings 14A, 14B and 14C also radially support the column 9 and absorb acceleration forces due to vibration. Thus the desired process containment is achieved with a high safety factor.

To assure rigid physical contact of the ball 17 of FIG. 3 and the differential force sensor 9, a spring assembly 16 provides assurance of a prescribed pre-load in combination with an intentional pre-load of bellows 10.

In FIG. 4 a piezoelectric sub-assembly 19 of the piezoelectric sensor 30 is shown. The piezoelectric sensor 30 is composed of a number of these piezoelectric sub-assemblies 19 stacked into a pile. Each sub-assembly has a pair of piezoelectric elements 22 poled in the direction of a common surface provided by a central metallic electrode 21 with an electrical connection 24 that is connected to the sensing electronics. The outer surfaces of the piezoelectric elements 22 are in contact with outer metallic electrodes 20 at ground potential. There are no insulators within the pile of this configuration and an increased output is simply achieved by adding more of these piezoelectric sub-assemblies 19 forming a higher pile.

FIG. 5 is an isometric view of the active components of sensor assembly 30. The articulating pad 27 interfaces a multiple stack of piezoelectric sub-assemblies 19 that are contained by a clamping pad 26 that has a prescribed pre-load applied by screw 25. An innovative spring 29 is attached to screw 25A and then extended and attached to screw 25B assuring that the pre-loads in screws 25A and 25B remain similar. Insulating tubes 28A and 28B insulate the electrical connector 24 providing isolation from electrical ground. This configuration serves to maintain the prescribed loading of the first and second piezoelectric force sensors. This is shown in FIG. 5.

An alternative configuration is shown in FIG. 5A. A spring applies a preload to a crank and the crank transfers this force into a torque that maintains the preload upon the piezoelectric sensor by means of a screw.

The differential force sensor 9 is shown in cross section in FIG. 6. The ball 17 of FIG. 3 is shown for reference with assured physical contact of beam 31 at a prescribed moment arm distance from flexure 36. The force applied to the beam 31 by the ball 17 is transferred to a ball 32 that is at an identical prescribed moment arm distance from flexure 36 on the opposing side of the beam 31. Ball 32 is supported by pad 27 in a manner that allows beam 31 to rotate with an angular deflection about flexure point 36 without inducing any angular deflection of pad 27. Assuring pad 27 does not have an angular deflection improves the response of the piezoelectric sensor 30. The improvement is obtained by assuring that the force applied to the piezoelectric elements 22 develops uniform compression over the entire surface. An angular deflection causes a pressure gradient over the piezoelectric element 22 surface. This undesired pressure gradient causes the higher stressed portion to piezoelectrically generate a charge that causes the lower stressed portion to act as a piezoelectric motor. Thus the charge is undesirably consumed internally.

The beam 31 of FIG. 6 is not subjected to energy absorbing bending loads for the forces applied to beam 31 have equal and opposing resultant forces provided by the piezoelectric sensors 30 and there is no differential torque applied to beam 31 except for a very minor amount of bending due to any restraint provided by flexure 36. Changing flexure 36 to a pivot easily eliminates the minor amount of bending. The flexure 36 is not required for producing a signal and solely exists to absorb common forces that would normally be applied to balls 32A and 32B. Thus pump pulsations, vibration and process pressure influences are absorbed and balanced by flexure 36 and beam 31. This approach assures that forces due to high process pressure are not applied to the piezoelectric sensor 19 and this avoids a high compressive stress that may de-pole the piezoelectric sensor 19.

The sensor is symmetric and the characteristics of side with identifier A are identical to the side with identifier B.

The frequency of vortex shedding is sensed by determining the common point in a differential comparison to determine when the electrical signal of vortices produced in one row is identical with the electrical signal of vortices produced in the opposing row. The electrical signals are of equal level and opposing phase. The crossing is commonly referred to as the "zero Crossing" of the two electrical signals of vortices produced. However, there are two conditions that limit the ability to determine the frequency due to conditions that influence the crossing.

One condition is the presence of a varying bias due to a strong vortex in a row with a weak opposing vortex in the opposite row of the von Karmen vortex street. This causes an error in detection of the crossing point with use of conventional electronic comparator reference that relies upon a "zero crossing" configuration. For the crossing may occur other than at the zero value due to the bias. This is eliminated by applying a configuration having one of the input electrical signals to a comparator selected as the reference rather than the conventional "zero crossing" value. Thus the undesired influences due biases of the crossings are effectively eliminated and precise vortex termination is achieved.

An additional condition is that if the signal level of each sensor is not of equal value. The differential approach normally eliminates common influences. However, if the response of both sensors is not equal for equal inputs it may develop an undesirable residual differential that may trigger a false indication of a vortex shedding. This is eliminated by a means of providing constant monitoring and equalization of the value of the signals with an automatic and constant gain control within the electronics.

The vortex flow meter has identical components in each of the pressure to uniaxial force transducers and the application of the differential approach eliminates all common mode influences in all planes. Thus pump pressure pulsations and also acceleration forces from all modes of vibration and in all planes are equal and opposite and self-canceling except for a rotational vibration about a point of symmetry of the pressure to uniaxial force transducers. However, this form of vibration is minimal and rarely encountered.

The vortex flow meter has several approaches for manufacturing. The vortex generator 4 and the extension 7 may be combined into a single part produced from wrought stock and then welded into the body 2. Most effectively the vortex generator 4, extension 7 and body 2 may be produced from a single casting with minimal machining as shown in FIG. 7 and cross sectional view of an assembly in FIG. 8.

A redundant sensing vortex flow meter may be produced from a single casting with minimal machining as shown in FIG. 9 and cross sectional view of an assembly in FIG. 10.

The invention claimed is:

1. A vortex flow meter comprising:
a body;
a flow conduit within said body;
a vortex generator located within and rigidly fixed to said flow conduit;
a cavity within said body connecting said flow conduit to the exterior of said body;
a housing located within said cavity that is attached to said body in a manner to contain process fluids; and
a flexible element that is attached to said housing in a manner to contain process fluids, the flexible element being located at the junction of said cavity and said flow conduit, said flexible element being attached to a column within said housing wherein said column applies a uniaxial force developed by varying pressure of vortices acting on the effective area of said flexible element;
said uniaxial force acting on a force sensor that is in rigid physical contact with said column, said force sensor being removably attached to the exterior of said body and wherein; said force sensor is capable of being removed from said body while flow continues in said body.

2. The device of claim 1 wherein the force sensor is capable of operating with high temperature process fluids.

3. The device of claim 2 wherein heat is dissipated to the environment along the length provided by said column.

4. A vortex flow meter comprising:
a body;
a flow conduit within said body;
a vortex generator located within said flow conduit and rigidly fixed to said flow conduit and
a first and a second cavity within said body connecting said flow conduit to the exterior of said body;
first and second housings located within each of said first and second cavities that are attached to said body in a manner to contain process fluids; and
first and second flexible elements attached to each of first and second said housings respectively in a manner to contain process fluids,
said first and second flexible elements being located at the junction of said first and second cavities and said flow conduit, wherein said first and second columns apply the uniaxial forces developed by varying pressure of vortices acting on the effective area of said first and second flexible elements upon a first and second force sensor, the force sensors being in rigid physical contact with said first and second columns and wherein said first and second force sensors are removably attached to the exterior of said body and are capable of being removed from said body while flow continues in said body.

5. The device of claim 4 wherein the first and second force sensors are capable of operating with high temperature process fluids.

6. The device of claim 4 wherein heat is dissipated along the length provided by said first and second columns providing for a significant temperature differential between the sensors and the vortex generator.

7. A vortex flow meter comprising:
a body;
a flow conduit within said body;
a vortex generator located within and rigidly fixed to said flow conduit;
a pressure to uniaxial force transducer, the transducer comprising:
first and second cavities within said body connecting said flow conduit to the exterior of said body;
a housing located within each of said first and second cavities that is attached to said body in a manner to contain process fluids;
first and second flexible elements attached to each of first and second said housings in a manner to contain process fluids; and
first and second differential force sensors in rigid physical contact with said first and second columns respectively; wherein said first and second flexible elements are located at the junction of said first and second cavities and said flow conduit,
wherein said first and second flexible elements are attached to first and second columns within said first and second housings, and
wherein said first and second columns apply the uniaxial forces developed by varying pressure of vortices acting on the effective area of said first and second flexible elements upon the differential force sensor, and
wherein said differential force sensor is removably attached to the exterior of said body, and
whereby the means of process containment provides a capability for said differential force sensor to be removeable from said body while flow continues in said body, and
wherein said differential force sensor operates at a temperature similar to the environment in high process temperature applications for heat is dissipated to the environment along the length provided by said first and second columns.

8. The device of claim 1 wherein the differential force sensor comprises:
a beam having equal first and second moment arms terminating equidistantly from a means of a common center of rotation;
means for applying a first force to said termination of said first moment arm and said first force is sensed and restrained by first piezoelectric force sensor;
means for applying a second force to said termination of said second moment arm wherein said second force is sensed and restrained by a second piezoelectric force sensor and wherein said first and said second piezoelectric force sensors provide an electrical output proportional to the differential of said first and said second forces; and
means for assuring a prescribed preload is maintained upon said first and said second piezoelectric force sensors,
wherein said differential force sensor is removably attached to a mounting surface upon said body, and
whereby the difference in said output of first and second piezoelectric force sensors is a measure of the difference between first and second forces, and
wherein equal first and second forces produce no said output of said differential force sensor.

9. The device of claim 4 wherein the differential force sensor comprises:
a beam having equal first and second moment arms terminating equidistantly from a means of a common center of rotation;
means for applying a first force to said termination of said first moment arm and said first force is sensed and restrained by first piezoelectric force sensor;
means for applying a second force to said termination of said second moment arm wherein said second force is sensed and restrained by a second piezoelectric force sensor and wherein said first and said second piezoelectric force sensors provide an electrical output proportional to the differential of said first and said second forces; and
means for assuring a prescribed preload is maintained upon said first and said second piezoelectric force sensors,
wherein said differential force sensor is removably attached to a mounting surface upon said body, and
whereby the difference in said output of first and second piezoelectric force sensors is a measure of the difference between first and second forces, and
wherein equal first and second forces produce no said output of said differential force sensor.

10. The device of claim 7 wherein the differential force sensor comprises:
a beam having equal first and second moment arms terminating equidistantly from a means of a common center of rotation;
means for applying a first force to said termination of said first moment arm and said first force is sensed and restrained by first piezoelectric force sensor;
means for applying a second force to said termination of said second moment arm wherein said second force is sensed and restrained by a second piezoelectric force sensor and wherein said first and said second piezoelectric force sensors provide an electrical output proportional to the differential of said first and said second forces; and
means for assuring a prescribed preload is maintained upon said first and said second piezoelectric force sensors,
wherein said differential force sensor is removably attached to a mounting surface upon said body, and
whereby the difference in said output of first and second piezoelectric force sensors is a measure of the difference between first and second forces, and
wherein equal first and second forces produce no said output of said differential force sensor.

11. The vortex flow meter of claim 1 wherein the flexible element comprises a bellows having one or more convolutions and wherein said bellows produce one or more uniaxial forces upon said first and second columns in proportion to applied pressure applied.

12. The vortex flow meter of claim 4 wherein the flexible element comprises a bellows having one or more convolutions and wherein said bellows produce one or more uniaxial forces upon said first and second columns in proportion to applied pressure applied.

13. The vortex flow meter of claim 7 wherein the flexible element comprises a bellows having one or more convolutions and wherein said bellows produce one or more uniaxial forces upon said first and second columns in proportion to applied pressure applied.

14. The vortex flow meter of claim 1 wherein said flexible element comprises a diaphragm that produces uniaxial forces upon said first and second columns in proportion to applied pressure.

15. The vortex flow meter of claim 4 wherein said flexible element comprises a diaphragm that produces uniaxial forces upon said first and second columns in proportion to applied pressure.

16. The vortex flow meter of claim 4 having one or more "o" ring seals within said first and second housings that seal said first and second housings and said first and second columns in a manner to achieve process containment upon failure of said first and second flexible elements, thereby providing multiple process containment.

17. The vortex flow meter of claim 7 having one or more "o" ring seals within said first and second housings that seal said first and second housings and said first and second columns in a manner to achieve process containment upon failure of said first and second flexible elements, thereby providing multiple process containment.

18. The vortex flow meter of claim 4 having a spring within each of said first and second housings providing a preload to maintain desired contact of said first and second columns to said first and second force sensors and whereby said desired contact of said first and second columns and said first and second force sensors is maintained during differential thermal expansion or significant inertial accelerations of said first and second columns and said first and second housings.

19. The vortex flow meter of claim 7 having a spring within each of said first and second housings providing a preload to maintain desired contact of said first and second columns to said first and second force sensors and whereby said desired contact of said first and second columns and said first and second force sensors is maintained during differential thermal expansion or significant inertial accelerations of said first and second columns and said first and second housings.

20. A vortex flow meter of claim 3 with a stop within each of said first and second pressure housings restraining said first and second columns when said first and second force sensors are removed.

21. The vortex flow meter of claim 1 wherein said flow conduit has first and second flat surfaces at the first and second interfaces of said vortex generator and said flow conduit, said first and second flat surfaces terminating at the extremities of said flow conduit and wherein said first and second flat surfaces are parallel and have a chordal width equal or less than W that is defined by W=(0.4*pipe inside diameter+0.94) expressed in inches, and wherein said first and second flat surfaces are interconnected by portions of a first and second cylindrical surface of said body thereby improving uniformity of vortex formation and a achieving a lower flow limit by reducing the cross sectional flow area of said flow conduit.

22. The vortex flow meter of claim 4 wherein said flow conduit has first and second flat surfaces at the first and second interfaces of said vortex generator and said flow conduit, said first and second flat surfaces terminating at the extremities of said flow conduit and wherein said first and second flat surfaces are parallel and have a chordal width equal or less than W that is defined by W=(0.4*pipe inside diameter+0.94) expressed in inches, and wherein said first and second flat surfaces are interconnected by portions of a first and second cylindrical surface of said body thereby improving uniformity of vortex formation and a achieving a lower flow limit by reducing the cross sectional flow area of said flow conduit.

23. The vortex flow meter of claim 6 wherein said flow conduit has first and second flat surfaces at the first and second interfaces of said vortex generator and said flow conduit, said first and second flat surfaces terminating at the extremities of said flow conduit and wherein said first and second flat surfaces are parallel and have a chordal width equal or less than W that is defined by W=(0.4*pipe inside diameter+0.94) expressed in inches, and wherein said first and second flat surfaces are interconnected by portions of a first and second cylindrical surface of said body thereby improving uniformity of vortex formation and a achieving a lower flow limit by reducing the cross sectional flow area of said flow conduit.

24. A vortex flow meter of claim 1 having electronic signal conditioning and amplification means wherein the signal conditioning means is capable of automatically and constantly assuring the absolute electrical signal level output of each of the said force sensors to equal inputs is equal thereby reducing or eliminating common mode influences.

25. A vortex flow meter of claim 1 having electronic signal conditioning and amplification capability including sensor signal processing means said sensor signal processing means:
   amplifies sensor signals;
   determines the differential of the opposing sensor signals;
   inverts the said differential of the opposing signals;
   applies the said differential of the opposing signals and the said inverted differential of the opposing signals as inputs to a comparator wherein either of the inputs are chosen as the reference for the said comparator and the said comparator determines the difference in the said differential of the opposing signals and the said inverted differential of the opposing signals; and
   upon sensing by the said comparator that the said difference in level of the said differential of the opposing signals and the said inverted differential are of equal value, the sensor signal processing means indicates the passage of a vortex, and wherein influences due to variations in the mean value of the said first and second force sensors are less significant than conventional use of a fixed zero reference value.

26. A vortex flow meter of claim 4 having electronic signal conditioning and amplification capability including sensor signal processing means said sensor signal processing means:
   amplifies sensor signals;
   determines the differential of the opposing sensor signals;
   inverts the said differential of the opposing signals;
   applies the said differential of the opposing signals and the said inverted differential of the opposing signals as inputs to a comparator wherein either of the inputs are chosen as the reference for the said comparator and the said comparator determines the difference in the said differential of the opposing signals and the said inverted differential of the opposing signals; and
   upon sensing by the said comparator that the said difference in level of the said differential of the opposing signals and the said inverted differential are of equal value, the sensor signal processing means indicates the passage of a vortex, and wherein influences due to variations in the mean value of the said first and second force sensors are less significant than conventional use of a fixed zero reference value.

27. A vortex flow meter comprising:
at least one vortex generator;
a flow conduit;
first and second pressure to uniaxial force transducers; and
first and second differential force sensors located at a first and second termination of said vortex generator and said flow conduit;
whereby the vortex flow meter has a redundant flow metering capability and the ability to operate with only one flow K-factor.

28. A vortex flow meter of claim 1 wherein said flexible elements have a pressure sensitive surface normal to the centerline axis of vortices said pressure sensitive surface being located within the said first and second flat surfaces.

29. A vortex flow meter of claim 7 wherein said flexible elements have a pressure sensitive surface normal to the centerline axis of vortices said pressure sensitive surface being located within the said first and second flat surfaces.

30. A differential force sensor of claim 4 having a means for maintaining said prescribed preload levels upon said first and second piezoelectric electric sensor, said preload maintenance means comprising:
first and second loading screws; and
an extension spring that is attached and made to conform to a portion of a cylindrical surface of a first loading screw of the first piezoelectric sensor wherein
said spring is made to conform to a portion of cylindrical surface of said second loading screw and
said first and said second preload screws are torqued to said prescribed preload levels and
said spring is extended and then attached to said second loading screw and
whereby the said prescribed loading levels of said first and second piezoelectric force sensors is maintained.

31. A differential force sensor of claim 7 having a means for maintaining said prescribed preload levels upon said first and second piezoelectric electric sensor, said preload maintenance means comprising:
first and second loading screws; and
an extension spring that is attached and made to conform to a portion of a cylindrical surface of a first loading screw of the first piezoelectric sensor wherein
said spring is made to conform to a portion of cylindrical surface of said second loading screw and
said first and said second preload screws are torqued to said prescribed preload levels and
said spring is extended and then attached to said second loading screw and
whereby the said prescribed loading levels of said first and second piezoelectric force sensors is maintained.

32. A vortex flow meter of claim 1 having a process temperature sensor located within said vortex generator, the process temperature sensor having a means for providing electrical connections to a device for producing an output of the process temperature sensed.

33. A vortex flow meter of claim 7 having a process temperature sensor located within said vortex generator, the process temperature sensor having a means for providing electrical connections to a device for producing an output of the process temperature sensed.

34. A vortex flow meter of claim 1 having a process pressure sensor located within said vortex flow meter, the process pressure sensor having a means for providing electrical connections to a device for producing an output of the process pressure sensed.

35. A vortex flow meter of claim 4 having a process pressure sensor located within said vortex flow meter, the process pressure sensor having a means for providing electrical connections to a device for producing an output of the process pressure sensed.

* * * * *